US010755264B2

(12) United States Patent
Prabhu et al.

(10) Patent No.: US 10,755,264 B2
(45) Date of Patent: Aug. 25, 2020

(54) METHODS AND SYSTEMS FOR SECURE ONLINE PAYMENT

(71) Applicant: Mastercard Asia Pacific Pte. Ltd., Singapore (SG)

(72) Inventors: Rajen Prabhu, Singapore (SG); Advait Sinha, Singapore (SG); Joseph Damon Hayes, Singapore (SG)

(73) Assignee: MASTERCARD ASIA PACIFIC PTE. LTD., Singapore (SG)

( * ) Notice: Subject to any disclaimer, the term of this patent is extended or adjusted under 35 U.S.C. 154(b) by 1043 days.

(21) Appl. No.: 14/878,167

(22) Filed: Oct. 8, 2015

(65) Prior Publication Data
US 2016/0104152 A1 Apr. 14, 2016

(51) Int. Cl.
*G06Q 40/00* (2012.01)
*G06Q 20/36* (2012.01)
(Continued)

(52) U.S. Cl.
CPC .......... *G06Q 20/363* (2013.01); *G06Q 20/12* (2013.01); *G06Q 20/36* (2013.01);
(Continued)

(58) Field of Classification Search
USPC ...... 705/44, 35, 37, 38, 39, 65, 50; 709/217, 709/226, 245, 203; 715/719; 707/689;
(Continued)

(56) References Cited

U.S. PATENT DOCUMENTS 6,609,113 B1 8/2003 O'Leary et al.
6,879,965 B2 * 4/2005 Fung ............... G06Q 20/10
235/379
(Continued)

OTHER PUBLICATIONS

Enhancement of security with the help of real time authentication and one time password in e-commerce transactions (English); Z. Zareh Hosseini, E. Barkhordari; The 5th Conference on Information and Knowledge Technology (pp. 268-273); May 1, 2013. (Year: 2013).*
(Continued)

*Primary Examiner* — Tien C Nguyen
(74) *Attorney, Agent, or Firm* — Armstrong Teasdale LLP

(57) ABSTRACT

A secure online payment system in which, upon initiation by a card holder of a payment operation to an online merchant, the card holder is directed to a wallet-hosting website which stores at least one digital wallet associated with the card holder. Each digital wallet is associated with at least one payment card associated with the card holder, and the website has access to database storing payment card data relating to the payment card. At the website, a card holder authentication process is performed. Upon successful authentication, payment card data is extracted from the database, and a successful authentication indicator message is generated and returned to the merchant. The successful authentication indicator message includes the payment card data, code indicating that the card holder has been successfully identified, and code indicative of the fact that the payment card is registered in the wallet.

12 Claims, 2 Drawing Sheets

(51) Int. Cl.
*G06Q 20/12* (2012.01)
*G06Q 20/40* (2012.01)

(52) U.S. Cl.
CPC ....... *G06Q 20/3674* (2013.01); *G06Q 20/409* (2013.01); *G06Q 20/4018* (2013.01)

(58) Field of Classification Search
USPC ...................................................... 726/5, 28
See application file for complete search history.

(56) References Cited

U.S. PATENT DOCUMENTS

| | | | |
|---|---|---|---|
| 7,305,470 B2 * | 12/2007 | Tom | G06Q 20/3674 709/225 |
| 7,343,351 B1 | 3/2008 | Bishop et al. | |
| RE40,444 E | 7/2008 | Linehan | |
| 7,676,431 B2 | 3/2010 | O'Leary et al. | |
| 7,801,827 B2 | 9/2010 | Bishop et al. | |
| 7,953,671 B2 | 5/2011 | Bishop et al. | |
| 7,962,409 B2 | 6/2011 | O'Leary et al. | |
| 8,175,967 B2 | 5/2012 | O'Leary et al. | |
| 8,175,968 B2 | 5/2012 | O'Leary et al. | |
| 8,190,521 B2 | 5/2012 | O'Leary et al. | |
| 8,214,299 B2 | 7/2012 | Bishop et al. | |
| 8,359,274 B2 * | 1/2013 | Yoder | G06Q 20/40 705/64 |
| 8,423,476 B2 | 4/2013 | Bishop et al. | |
| 8,433,652 B2 | 4/2013 | O'Leary et al. | |
| 8,433,658 B2 | 4/2013 | Bishop et al. | |
| 8,473,355 B2 | 6/2013 | Quigley et al. | |
| 8,489,513 B2 | 7/2013 | Bishop et al. | |
| 8,694,425 B2 | 4/2014 | O'Leary et al. | |
| 8,738,517 B2 * | 5/2014 | Bedier | G06Q 20/12 705/39 |
| 8,762,283 B2 * | 6/2014 | Gerber | G06Q 20/40 705/26.1 |
| 8,924,310 B2 | 12/2014 | Bishop et al. | |
| 8,938,402 B2 | 1/2015 | Bishop et al. | |
| 9,043,240 B2 | 5/2015 | Langus et al. | |
| 9,830,594 B2 * | 11/2017 | Weiner | G06Q 20/3224 |
| 10,223,707 B2 * | 3/2019 | Granville, III | G06Q 30/0207 |
| 2002/0128977 A1 | 9/2002 | Nambiar et al. | |
| 2007/0112688 A1 | 5/2007 | Zissimopoulos et al. | |
| 2007/0143227 A1 * | 6/2007 | Kranzley | G06Q 20/02 705/67 |
| 2007/0288392 A1 | 12/2007 | Peng et al. | |
| 2012/0143752 A1 | 6/2012 | Wong et al. | |
| 2013/0054470 A1 | 2/2013 | Campos et al. | |
| 2013/0297504 A1 | 11/2013 | Nwokolo et al. | |
| 2013/0346223 A1 | 12/2013 | Prabhu et al. | |
| 2014/0372319 A1 | 12/2014 | Wolovitz | |
| 2015/0112869 A1 | 4/2015 | Radu et al. | |
| 2015/0248670 A1 | 9/2015 | Langus et al. | |
| 2015/0254645 A1 | 9/2015 | Bondesen et al. | |
| 2015/0254662 A1 | 9/2015 | Radu | |
| 2015/0269701 A1 | 9/2015 | Malhotra et al. | |

OTHER PUBLICATIONS

Secure Communication for Internet Payment in Heterogeneous Networks; 2010 24th IEEE International Conference on Advanced Information Networking and Applications (pp. 1085-1092); : Abdel-laoui, R., Pasquet, M; Apr. 1, 2010. (Year: 2010).*
Emerging ecommerce credit and debit card protocols; Proceedings. Third International Symposium on Electronic Commerce, (pp. 39-46); M.E. Peters; Jan. 1, 2002. (Year: 2002).*
PCT Search Report and Written Opinion, application No. PCT/SG2015/050376, dated Jan. 13, 2016, 11pp.

* cited by examiner

METHODS AND SYSTEMS FOR SECURE ONLINE PAYMENT

CROSS REFERENCE TO RELATED APPLICATIONS

This application claims the benefit of SG Patent Application No. 10201406521T filed Oct. 10, 2014, which is hereby incorporated by reference in its entirety.

BACKGROUND OF THE DISCLOSURE

The present invention relates to methods and systems of permitting a financial transaction using the internet.

3-D Secure is an XML-based protocol designed to be an additional security layer for online transactions using a payment card (e.g., a credit card or debit card). The protocol ties the financial authorization process to an online authentication. This authentication is based on a three-domain model, the three domains being i) an acquirer domain (i.e., the online merchant and the merchant's bank, referred to as the "acquirer" bank), ii) an issuer domain supported by a server of the bank which issued the payment card, and iii) an interoperability domain supported by an access control server (ACS) for the issuing bank, which supports a 3-D Secure authentication web page for the issuing bank.

When a card holder who is interacting with an online merchant wants to make a payment, he makes a payment request to the merchant domain, including entering his full credit card details. In response to the payment request, a Merchant Plug In (MPI) component is activated. The MPI talks to the issuer domain to check if the card is enrolled for 3-D Secure. If the card is not enrolled, this means that either the bank that issued the card is not yet supporting 3-D Secure or it means that the card holder has not yet been registered for the service.

If the card is enrolled, the MPI will redirect the card holder to the 3-D Secure authentication web page for the ACS associated with the issuing bank. The card holder will then identify himself. There are several methods in which this can be done. For example, in some implementations the card holder is required to enter a pre-agreed password into the 3-D Secure authentication web page (typically, the card holder selected the password the first time that he used the 3-D Secure system). In another system, a one-time passcode (OTP) is generated by the ACS, and transmitted by an SMS message to a pre-registered mobile phone owned by the card holder, or transmitted by email to an email address owned by the card holder. The card holder enters the OTP into the 3-D Secure authentication page.

Following the authentication, the interoperability domain transmits a reply to the MPI. The message includes a field called a Universal Cardholder Authentication Field (UCAF) storing a value which only the card issuer is able to generate, because generating it requires data which is kept confidential. In some systems this value is referred to as an AAV (Accountholder Authorization Value) and in other systems this value is referred to as a CAVV (Cardholder Authentication Verification Value). An AAV is generated by the interoperability domain (more exactly the AAV is typically generated by an applet issued by the ACS and running on the card holder's computer, and the AAV is transmitted by the applet to the ACS), and incorporates information specific to both the transaction and the cardholder's identity, thereby binding the cardholder to a particular transaction.

The MPI evaluates the reply and, if it indicates that the authentication was successful, allows the transaction to proceed to a separate authorization process in which the acquiring domain communicates with the issuing bank to ask the bank to authorize the transaction. As part of this process, the acquiring domain transmits the AAV to the issuing bank. The transaction could still fail for lack of funds or other reasons.

In certain countries, standards exist governing internet commerce, and compatibility with the standard can give provide certain advantages. The 3-D Secure process is compatible with some of these standards, and accordingly is able to benefit from such advantages.

There are disadvantages to at least some known 3-D Secure systems, however. Firstly, the card holder is required to enter a considerable amount of information: first the full card details (typically at least including a 16 digit number, and card expiry date, and often other data such as a CVC code); then, the card holder is required to enter the password/OTP required by the 3-D Secure authentication page. If the card holder's computer is a mobile device with a small screen, transferring the OTP from the SMS program to the 3-D Secure authentication page may be relatively difficult. Furthermore, card holders may be disconcerted when redirected to the 3-D Secure authentication page, which tends to have a different look and feel. This leads some card holders to suspect that fraudulent activity may be occurring. These problems result in card holders being reluctant to complete the online purchase, and a proportion of online purchases may fail due to card holders who decline or fail to follow the procedure.

To alleviate such problems, MasterCard International Incorporated provides the MasterPass® system. In this system, a card holder sets up one or more "digital wallets" on a wallet-hosting server. There are two forms of wallet-hosting server. One is a server operated by an organisation which is not itself a card issuer, but which is a trusted partner of the card issuer (in existing implementations, the organisation may be MasterCard International Incorporated itself). The other form is a server operated by a card issuer (conventionally, a wallet on such a server is referred to as a "partner-hosted wallet"). Both the server(s) operated by MasterCard International Incorporated, and the servers operated by card issuers use the same APIs (developed by MasterCard International Incorporated), so that the user sees no difference in using the two forms of wallet-hosting server.

A card holder registers his or her payment card with a digital wallet. Having done this, the card holder can interact with a participating online merchant. At the check-out stage, the online merchant displays a button on the merchant website which the card holder can click on in order to make a payment using the card holder's digital wallet. The online merchant then redirects the user to a "switch" operated by MasterCard International Incorporated. Using a cookie located on the card holder's computer, the "switch" is able to determine which wallet-hosting server hosts a wallet associated with the card holder. The switch then establishes a connection between the card holder's computer and the appropriate wallet-hosting system, which presents the card holder with a MasterPass sign-in page (e.g., as a pop-up window), where there is an authentication process (e.g., entry of a pre-agreed password). This log-in process may use the same login credentials (e.g., password) which the user also uses to obtain access to other online banking activities.

Following the authentication process, if more than one digital wallet has been created for a given card holder, the card holder chooses the digital wallet he or she would like to use. If more than one payment card is associated with the digital wallet, he or she chooses one of the payment cards.

He or she may further confirm a shipping address he or she wishes to use (e.g., by selecting from previously entered addresses). The wallet-hosting system then securely transfers the card holder's payment and shipping information to the online merchant's domain. The merchant's domain submits the card holder's payment information to the acquiring bank as under the 3D Secure system, for a separate authorization process in which the acquiring domain communicates with the issuing bank to ask the bank to authorize the transaction. Thus, in contrast to the 3-D Secure system, the card holder is not required to enter their card details (except at the stage of initially registering with the wallet-hosting system), and the online transaction process is streamlined with only a single redirection, and consistent branding for the entire payment process, irrespective of the online merchant.

In a variant of the above system ("advanced checkout"), it is known to integrate the MasterPass system with the 3-D Secure system such that, instead of the wallet-hosting server itself authenticating the card holder, it establishes a connection with an ACS associated with card-issuing bank, which performs a card holder authentication (using a fixed password or a OTP), and transmits an AAV to the wallet-hosting server, which in turn passes it to the merchant. The use of the 3-D Secure system means that the advanced checkout variant complies with those legal standards with which 3-D Secure system complies, and thus the advanced checkout variant benefits from the advantages of the 3-D Secure system. However, the advanced checkout variant suffers from the disadvantages of the 3-D Secure system. Firstly, undesirable redirection of the card holder to an ACS occurs. Secondly, in the case that the ACS uses an OTP, inputting the OTP may be relatively complicated. Note that the operator of wallet-hosting domain cannot control whether the ACS of the issuer bank uses a OTP.

BRIEF DESCRIPTION OF THE DISCLOSURE

In the systems and methods described herein, upon initiation by a card holder of a payment operation to an online merchant, the card holder is directed to a wallet-hosting domain which stores at least one digital wallet associated with the card holder. Each digital wallet is associated with at least one payment card associated with the card holder, and the website (i.e., the wallet-hosting domain) has access to database storing payment card data relating to the payment card. At the website, a card holder authentication process is performed. Upon successful authentication, payment card data is extracted from the database, and a successful authentication indicator message is generated and returned to the merchant. The successful authentication indicator message includes the payment card data, code indicating that the card holder has been successfully identified, and code generated by the wallet-hosting domain and indicating that the payment card is registered in the wallet. The merchant is then enabled to perform a payment authorization process, using the payment card data and the authentication indicator message.

The code indicating that the card is registered in the wallet may be a code which can only be generated by the card issuer, or using confidential information obtained from the card issuer, such as a cryptographic code (e.g. an AAV or CAVV).

Alternatively, the code may be data encoding the identity of the wallet together with a flag indicating that the payment card is registered in the wallet.

Due to the generation and transmission of the authentication indicator message, the embodiments described herein may be compatible with the legal standards with which the 3-D Secure system is compatible, and thus enjoy the advantages of compatibility with those standards, without there being a need for a redirection from the wallet-hosting website to an ACS.

Furthermore, the operator of the wallet-hosting domain can decide to perform the user authentication without using a OTP.

As mentioned above, the code indicating that the card is registered in the wallet is generated in the wallet-hosting domain itself, rather than obtained via a redirection to another domain. The wallet-hosting domain may be a website hosted on a single server, and under the control of a single proprietor, or the common ownership of a set of proprietors. In other words, the code is generated other than by a redirection to another domain, under the control of different proprietor(s).

Thus, there is made possible an issuer-hosted environment in which consumers can authenticate themselves in the absence of an ACS generated One Time Password, and without either a static or dynamic one time password for every transaction. This results in an enhanced user experience and shorter checkout flow while still enabling issuers to authenticate the consumer.

BRIEF DESCRIPTION OF THE DRAWINGS

Example embodiments will now be described for the sake of example only with reference to the following drawings in which.

DETAILED DESCRIPTION OF THE DISCLOSURE

Figure 1:
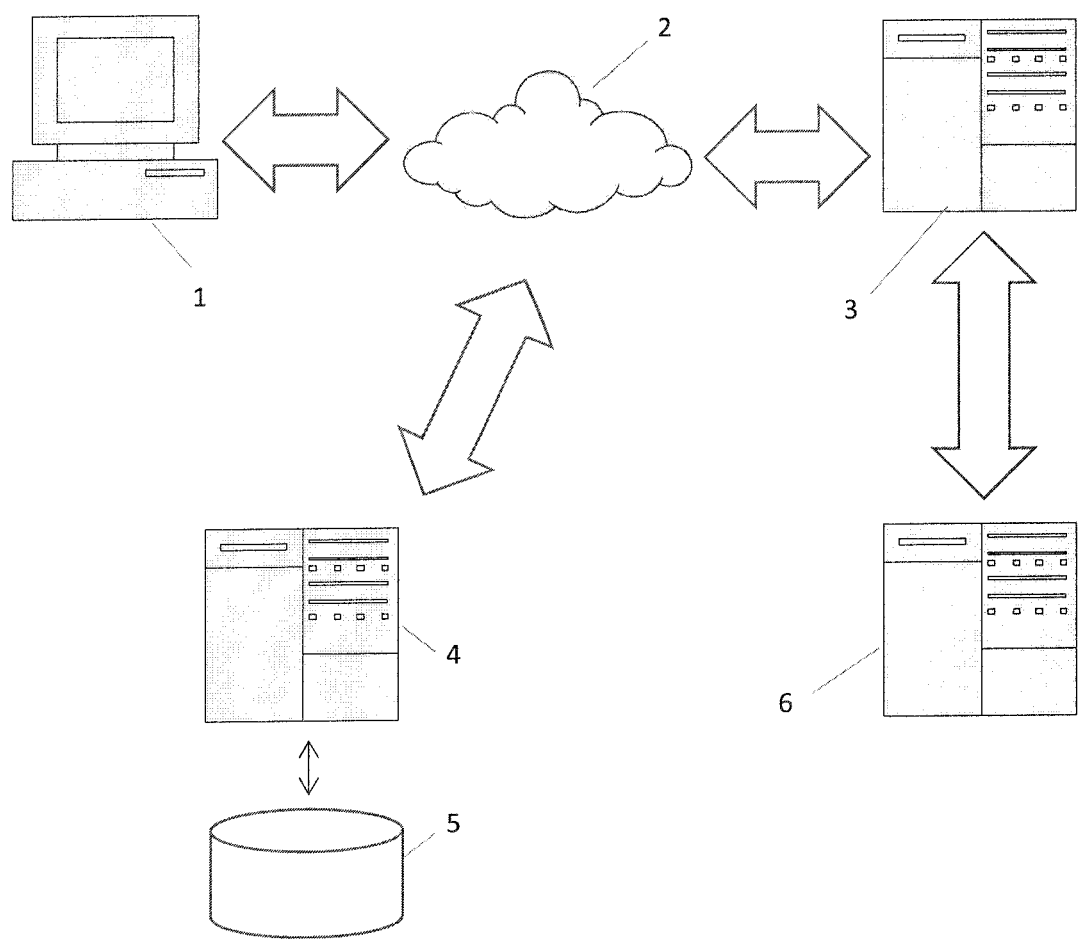
FIG. 1 is a schematic diagram of a system employing an authentication process according to an example embodiment.
Figure 2:
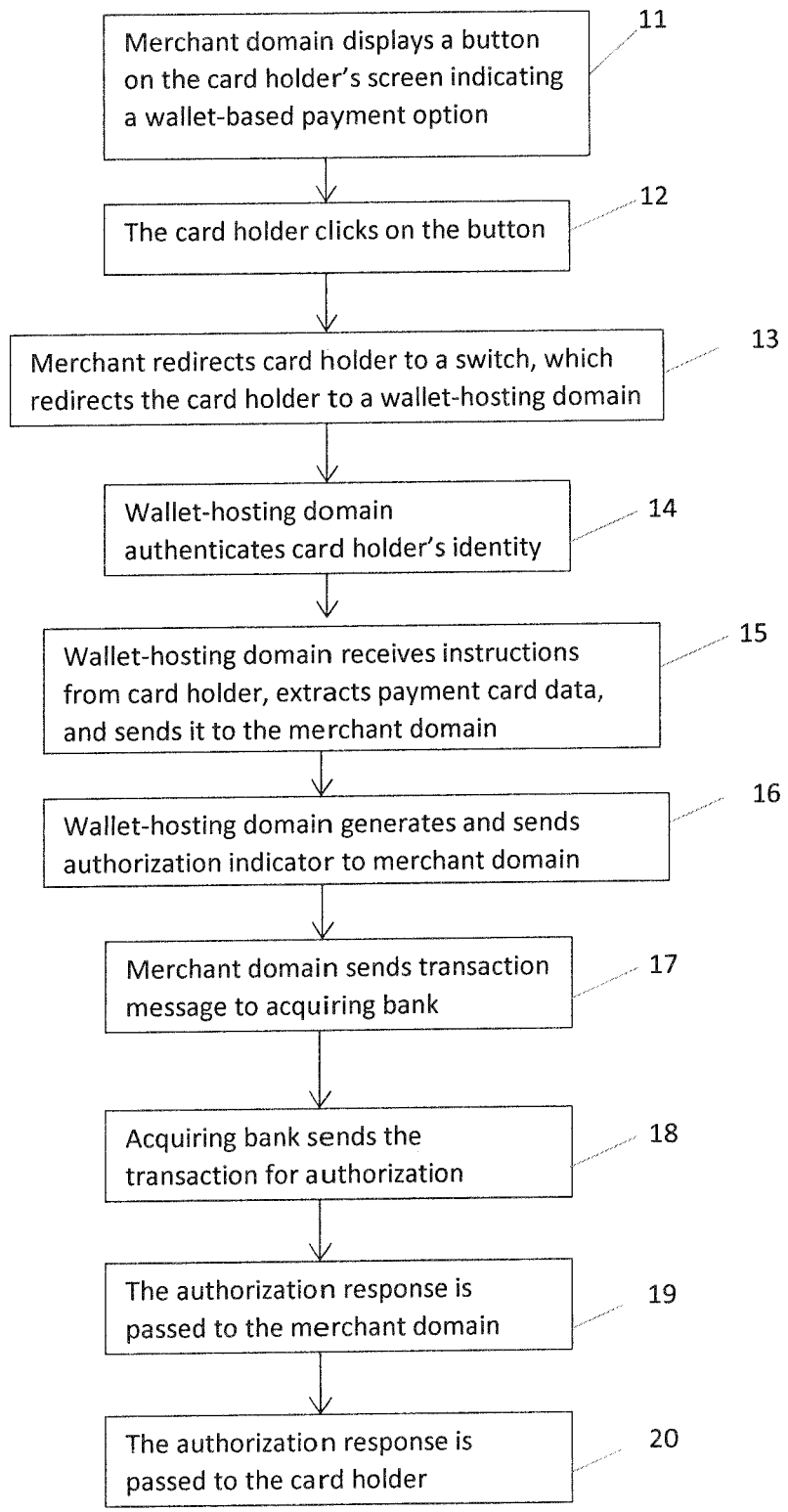
FIG. 2 is a flow chart of an authentication process carried out by the system of FIG. 1.

Referring to FIG. 1, a system is shown which performs an authentication process according to an example embodiment. The steps of the method are as shown in FIG. 2.

A card holder wishes to make a purchase using a computer 1 which he or she controls. The computer 1 may be a PC, a mobile device such as a mobile telephone or tablet, or any other device with a processing capability. The computer 1 is connected to the internet 2, and initially communicates over the internet 2 with an online merchant domain 3. The term "merchant domain" is used to describe any site which is capable of receiving a payment, so it includes not only distributors of physical objects, but also of distributors of digital data (e.g. music or software). Indeed, the merchant domain may be a domain which does not provide any service to a card-holder, such as a gateway for charitable contributions. The online merchant domain 3 may be supported by a single server (as illustrated in FIG. 1), but the online merchant domain may alternatively be implemented by multiple servers, or in the cloud.

The online merchant domain 3 displays a webpage on a screen of the computer 1, normally via browser software stored on the computer and communicating with the online merchant domain 3 via the internet 2. When a card holder is to make a payment, such as during a check-out procedure, the webpage which the online merchant domain 3 displays on the screen includes a region ("button") indicating that there is an option of making the payment using a digital wallet system (step 11 of FIG. 2). In step 12 of FIG. 2, the card holder selects (e.g. clicks on) the button, to indicate that he desires to make a wallet-based transaction.

The online merchant domain 3 is able to initiate communication between the computer 1 and a wallet-hosting domain 4 (step 13). For example, this may be by redirecting the webpage the online merchant domain was previously displaying on the screen of the computer 1, to a webpage hosted by the wallet-hosting domain (alternatively, the online merchant may initiate a process in which a new pop-up window opens on the computer 1, displaying the webpage hosted by the wallet-hosting domain). The wallet-hosting domain is one with which the card holder has previously registered. The wallet-hosting domain is typically supported by a server, or more generally a processor running software stored on a data storage device.

In fact, the wallet-hosting domain 4 is one of a plurality of wallet-hosting domains (the others are not shown in FIG. 1). All may use, for example, the same APIs, so that the user sees no difference in using any of the wallet-hosting servers. The card holder has generally registered with just one of these wallet-hosting domains. As in the MasterPass system, the online merchant domain 3 redirects the user to a switch which is able to access data, such as a cookie, stored in the computer 1, to indicate the identity of the wallet-hosting domain 4 with which the card holder has registered. If the computer 1 does not contain this data, then the switch may present the user with a screen on which the user can indicate which wallet-hosting domain 4 his/her payment card is registered with.

The wallet-hosting domain 4 may be supported by a single server (as illustrated in FIG. 1), but may alternatively be supported by multiple servers. In either case, the wallet-hosting domain 4 is a single domain, and for example is operated and controlled by a single entity. The wallet-hosting domain 4 has access to a database 5 storing, for each of multiple card holders, data defining one or more digital wallets. The data defining each digital wallet includes payment card data which describes one or more payment cards. The payment card data typically includes the number of the payment card, the registered card holder of the payment card, and the expiry date.

In step 14, the wallet-hosting domain 4 performs an authentication of the card holder. This may be performed in the same way as in the MasterPass system. In some embodiments, it is performed by the card holder entering a pre-agreed passcode, so that there is no need for a OTP to be generated and sent.

If in step 14 the wallet-hosting domain 4 successfully verifies the identity of the card holder, then in step 15 the wallet-hosting website 4 permits the card holder to input instructions to the wallet-hosting domain 4. For example, if the card holder is associated with a plurality of digital wallets, the card holder can select one of them. If the selected wallet (or, in the case of a card holder with only one wallet, that wallet) is associated with a plurality of payment cards, the card holder can select one of them. The web-hosting domain then extracts from the database 5 the payment card data associated with the payment card, and transmits the payment card data to the merchant domain 3.

In order for the wallet-hosting domain 4 to be permitted to have such a database, it is envisaged that the wallet-hosting domain is either controlled (and likely owned) by the payment card issuing bank (in which case, typically all the payment cards recorded at the wallet-hosting domain will be issued by the same issuing bank), or else by a trusted party (such as MasterCard International Limited). As mentioned above, the wallet-hosting domain 4 may be just one of a plurality of wallet hosting domains, some of which will be operated by payment card issuing banks, and other(s) of which will be operated by third parties.

The database 5 may also contain geographical location data associated with the card holder, so that, particularly if the payment is in relation to a geographical location (for example, it may relate to an order to dispatch goods to a certain postal address), the wallet-containing domain 4 can dispatch the geographical location data to the merchant domain 3.

The wallet-hosting domain also generates an authentication indicator message, and transmits it to the merchant domain 3. The authentication indicator message includes information generated by the wallet-hosting domain (possibly by the processor of the wallet-hosting domain, or possibly at least partly by causing an applet transmitted from the wallet-hosting domain to run on the computer 1) and indicating that the payment card is registered in the wallet.

The authentication indicator message may, for example, be a cryptographic code, such as an AAV or CAVV (e.g., in any of the formats used in 3-D Secure systems) which includes information specific to both the transaction and the card holder's identity, thereby binding the cardholder to a particular transaction. To generate the cryptographic code the wallet-hosting domain 4 may require confidential information known to the payment card's issuer. For example, the confidential information may be information about an algorithm (e.g., a cryptogram) used to generate the cryptographic code. As noted above, the wallet-hosting domain 4 may actually be operated by the payment card's issuer, and have the confidential information for that reason. Alternatively, if the wallet-hosting domain 4 is operated by a trusted-third party, it is one to which this confidential information has been entrusted by the payment card issuer.

It is conceivable that there will be situations in which a payment card is registered in a wallet-hosting domain operated by an organisation which does not have access to this confidential information (e.g., if the wallet-hosting domain is operated by a bank which is different from the card-issuing bank). In this case, the wallet-hosting domain, rather than making use of a method according to FIG. 2, may contact an ACS associated with the card-issuing bank. In other words, in this type of situation, the authorization of the card may be performed using the "advanced checkout" variant of the MasterPass system.

Alternatively, the authentication indicator message may be data identifying the card holder's wallet (or, in the case that a user has multiple wallets, the selected wallet), and containing additional code indicating that the authentication was successful.

The security of the example embodiment is improved due to the generation and transmission of the AAV, and the system is compatible with the legal standards which require an authentication indicator message, thus achieving the associated advantages.

As compared to the advanced checkout variant of the MasterPass system, because the generation and transmission of the authentication indicator message (e.g., AAV) is performed without invoking an additional ACS associated with a card issuer, there is no redirection of the computer 1 to another web domain, no new windows have to be opened on the computer 1, and all presentation can be controlled by the wallet-hosting domain 4, in a consistent fashion. Furthermore, in most implementations of the advanced checkout variant of the MasterPass system, the 3-D Secure component performs its authentication using a OTP. However, in the embodiments described herein, the wallet-hosting domain authenticates the identity of the card holder without using a OTP. The operator of the wallet-hosting domain can thus ensure that no OTP is used.

Note that the embodiments described herein perform authentication differently than the existing MasterPass system. They generally require that the wallet-hosting domain has the ability to generate an authentication indicator, and transmit it to the merchant. These functions are not present in the existing MasterPass systems.

These functions may be present in ACS servers, but unlike existing ACS servers, the wallet-hosting domain 4 also contains code to give authenticated access to a digital wallet. Unlike a conventional ACS, the wallet-hosting domain 4 has access to the database 5 of payment card data, and is able to extract payment card data from the database 5. Furthermore, unlike an ACS, the software of the wallet-hosting domain 4 contains a control logic which enables it to recognise that a payment card for which it receives an authorization request is one of the payment cards registered with a wallet it supports. As noted above, the wallet-hosting domain 4 may be controlled by a payment card issuing bank, in which the control logic might initially recognise that the payment card is issued by the same bank. Furthermore, to ensure that the card holder is able to obtain the same experience irrespective of which wallet-hosting domain 4 is used, each wallet-hosting domain 4 is capable of passing the authentication indicator from the wallet to the merchant domain 3 via a standardized API (Application programming interface).

The remaining steps of the payment process are similar to those in known 3-D Secure and MasterPass systems. In step 17, the merchant domain 3 submits a transaction message containing the payment card data and the authentication indicator message to an acquiring bank 6 associated with the merchant domain 3.

In step 18, the acquiring bank communicates with the credit card network and the issuing bank of the payment card to obtain BAU (business as usual) authorization. This results in an authorization response, which indicates either success or failure.

In either case, in step 19, the authorization response is passed from the acquiring bank 6 to the merchant domain 3. The merchant domain 3 reacts accordingly. For example, if the authorization response is positive, and the payment is to pay the online merchant to perform a certain service (e.g., to send goods to a certain location), then the merchant domain carries out the service.

In step 20, the authorization response is passed by the online merchant domain 3 to the computer 1. In the case that the authorization response is positive, the online merchant domain may additionally pass to the computer 1 information concerning the performance of the service which has been paid for (e.g., an indication that goods will be dispatched).

The resulting technical effect achieved by the systems and methods described herein may include at least one of: (i) displaying a web interface on a screen of a computer of a card holder; (ii) receiving data from the computer of the card holder via the web interface; (iii) using the received data to authenticate the identity of the card holder; (iv) upon successfully authenticating the identity of the card holder, extracting, from a database of a server system, payment card data describing a payment card associated with the card holder; (v) transmitting the payment card data to the online merchant domain; and (vi) generating, and transmitting to the online merchant domain, an authentication indicator message indicating that the authorization was successful and containing data indicating that the payment card is registered in the wallet.

The foregoing description enables persons of ordinary skill in this technical field to implement the embodiments described herein. Those persons will also appreciate and obtain equivalents, variations and combinations of the embodiments. The invention is therefore not limited by the above described example embodiments, but by all methods and systems within the scope and spirit of the claims.

What is claimed is:

1. A method performed by a single web domain, for authenticating a card holder to enable a payment to an online merchant domain, the method comprising, upon the card holder initiating a payment process in relation to the online merchant domain:
    receiving, at the web domain, data from the card holder;
    using, at the web domain, the received data to authenticate the identity of the card holder;
    upon the web domain successfully authenticating the identity of the card holder, extracting, from a database of the web domain, payment card data describing a payment card associated with the card holder;
    transmitting, using the web domain, the payment card data to the online merchant domain; and
    generating and transmitting to the online merchant domain, by the web domain, an authentication indicator message i) indicating that the authentication was successful and ii) containing data indicating that the payment card is registered in a digital wallet, wherein the web domain has access to confidential information that includes a cryptogram known to an issuer of the payment card and used to generate a cryptographic code, wherein the web domain generates the authentication indicator message using the cryptogram and without redirecting a browser of the card holder to a further web domain for authentication, wherein the web domain is separate from the online merchant domain, and wherein the web domain is operated by the issuer or a trusted party that the issuer has entrusted the confidential information to.

2. The method of claim 1, wherein the authentication indicator message includes the cryptographic code generated using the cryptogram known to the issuer of the payment card.

3. The method of claim 1, wherein the authentication indicator message includes one of an Accountholder Authorization Value (AAV) and a Cardholder Authentication Verification Value (CAVV).

4. The method of claim 1, wherein the web domain is a wallet-hosting domain, and wherein the database contains data which, for each of a plurality of pre-registered card holders, defines a respective one or more digital wallets, the digital wallets each being associated with one or more corresponding payment cards associated with the respective plurality of pre-registered card holders.

5. The method of claim 4, wherein the authentication indicator message includes data identifying a digital wallet associated with the card holder.

6. The method of claim 4, wherein the card holder is one of the plurality of the pre-registered card holders, and the wherein method further comprises at least one of:
    receiving a selection from the card holder of one of a plurality of digital wallets associated with the card holder; and receiving a selection from the card holder of one of a plurality of payment cards associated with the digital wallet.

7. A server system supporting a single web domain, for authenticating a card holder to enable a payment to an online merchant domain, the server system comprising:
a processor; and
a data storage device storing program code which, upon implementation by the processor causes the processor to:
(i) display a web interface on a screen of a computer of the card holder;
(ii) receive data from the computer of the card holder via the web interface;
(iii) use the received data to authenticate the identity of the card holder;
(iv) upon successfully authenticating the identity of the card holder, extract, from a database of the server system, payment card data describing a payment card associated with the card holder;
(v) transmit the payment card data to the online merchant domain; and
(vi) generate and transmit to the online merchant domain, an authentication indicator message indicating that the authentication was successful and containing data indicating that the payment card is registered in the wallet, wherein the web domain has access to confidential information that includes a cryptogram known to an issuer of the payment card and used to generate a cryptographic code, wherein the web domain generates the authentication indicator message using the cryptogram and without redirecting a browser of the card holder to a further web domain for authentication, wherein the web domain is separate from the online merchant domain, and wherein the web domain is operated by the issuer or a trusted party that the issuer has entrusted the confidential information to.

8. The server system of claim 7, wherein the authentication indicator message includes the cryptographic code generated using the cryptogram known to the issuer of the payment card.

9. The server system of claim 7, wherein the authentication indicator message includes one of an Accountholder Authorization Value (AAV) and a Cardholder Authentication Verification Value (CAVV).

10. The server system of claim 7, wherein the web domain is a wallet-hosting domain, and the database contains data which, for each of a plurality of pre-registered card holders, defines a respective one or more digital wallets, the digital wallets each being associated with one or more payment cards associated with the respective plurality of pre-registered card holders.

11. The server system of claim 10, wherein the authentication indicator message comprises data identifying a digital wallet associated with the card holder.

12. The server system of claim 10, wherein the card holder is one of the plurality of the pre-registered card holders, and the program code causes the processor to perform at least one of:
receiving a selection from the card holder of one of a plurality of digital wallets associated with the card holder; and
receiving a selection from the card holder of one of a plurality of payment cards associated with a digital wallet.

* * * * *

UNITED STATES PATENT AND TRADEMARK OFFICE
CERTIFICATE OF CORRECTION

PATENT NO. : 10,755,264 B2
APPLICATION NO. : 14/878167
DATED : August 25, 2020
INVENTOR(S) : Rajen Prabhu et al.

Page 1 of 1

It is certified that error appears in the above-identified patent and that said Letters Patent is hereby corrected as shown below:

On the Title Page

Item [30], insert therefor -- October 10, 2014 (SG) 10201406521T --.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*